(12) United States Patent
Sullwold et al.

(10) Patent No.: US 10,766,343 B2
(45) Date of Patent: Sep. 8, 2020

(54) DOOR ASSEMBLY FOR A VEHICLE

(71) Applicant: Polaris Industries Inc., Medina, MN (US)

(72) Inventors: Randall J. Sullwold, Somerset, WI (US); Jeremiah S. Schweitzer, Frederic, WI (US)

(73) Assignee: Polaris Industries Inc., Medina, MN (US)

( * ) Notice: Subject to any disclaimer, the term of this patent is extended or adjusted under 35 U.S.C. 154(b) by 2 days.

(21) Appl. No.: 16/184,547

(22) Filed: Nov. 8, 2018

(65) Prior Publication Data
US 2020/0148042 A1 May 14, 2020

(51) Int. Cl.
*B60J 5/04* (2006.01)
*E05D 1/04* (2006.01)
*E05C 17/12* (2006.01)

(52) U.S. Cl.
CPC ............. *B60J 5/0472* (2013.01); *E05C 17/12* (2013.01); *E05D 1/04* (2013.01); *B60J 5/0487* (2013.01); *E05D 2001/045* (2013.01); *E05Y 2900/531* (2013.01)

(58) Field of Classification Search
CPC ....... B60J 5/0472; B60J 5/0487; E05C 17/12; E05D 1/04; E05D 2001/045; E05D 2007/0469; E05D 7/06; E05Y 2900/531
USPC ...................................................... 296/146.11
See application file for complete search history.

(56) References Cited

U.S. PATENT DOCUMENTS

| 3,589,069 A * | 6/1971 | Lecomte | B60J 5/0472 49/257 |
|---|---|---|---|
| 6,676,193 B1 * | 1/2004 | Hanagan | B60J 5/0472 296/146.11 |
| 2005/0116497 A1 * | 6/2005 | DeBono | B60J 5/0472 296/146.11 |
| 2006/0123592 A1 * | 6/2006 | Yip | E05D 3/10 16/241 |
| 2007/0245525 A1 * | 10/2007 | Hoffman | E05D 15/00 16/367 |
| 2008/0079284 A1 * | 4/2008 | Moreno | B60J 5/0472 296/146.12 |

(Continued)

FOREIGN PATENT DOCUMENTS

| DE | 10025888 A1 | 11/2001 |
|---|---|---|
| DE | 202013010333 U1 | 2/2015 |
| EP | 0493225 A1 | 7/1992 |

OTHER PUBLICATIONS

International Search Report and Written Opinion issued in corresponding PCT Patent Application No. PCT/US2019/060451 dated Apr. 14, 2020.

*Primary Examiner* — Gregory A Blankenship
(74) *Attorney, Agent, or Firm* — Harness Dickey

(57) ABSTRACT

A door assembly for a vehicle. The door assembly has a door body and a hinge. The hinge is connected to the door body and is rotatable about an axis of the hinge. The hinge is configured to expand along the axis from a contracted position to an expanded position when rotated in a first direction, and is configured to contract along the axis from the expanded position to the contracted position when rotated in a second direction that is opposite to the first direction. In the contracted position, the door body is in a closed, lowered position. In the expanded position, the door body is in an open, raised position.

19 Claims, 8 Drawing Sheets

(56) References Cited

U.S. PATENT DOCUMENTS

| | | | |
|---|---|---|---|
| 2009/0106941 A1* | 4/2009 | Greenbank | B60J 5/0472 16/371 |
| 2011/0068600 A1* | 3/2011 | Schroter | B60J 5/0487 296/146.11 |
| 2013/0134738 A1* | 5/2013 | Le Duc | B60J 5/0484 296/146.11 |
| 2013/0319785 A1* | 12/2013 | Spindler | B62D 23/005 180/292 |
| 2016/0237727 A1* | 8/2016 | Balaz | B60J 5/0472 |
| 2016/0325608 A1* | 11/2016 | Gagas | B60J 5/0472 |
| 2018/0030764 A1* | 2/2018 | Shaw | E05D 3/10 |
| 2019/0118625 A1* | 4/2019 | Tate | E05D 15/101 |
| 2019/0218838 A1* | 7/2019 | Von Koenigsegg | B60J 5/0472 |

* cited by examiner

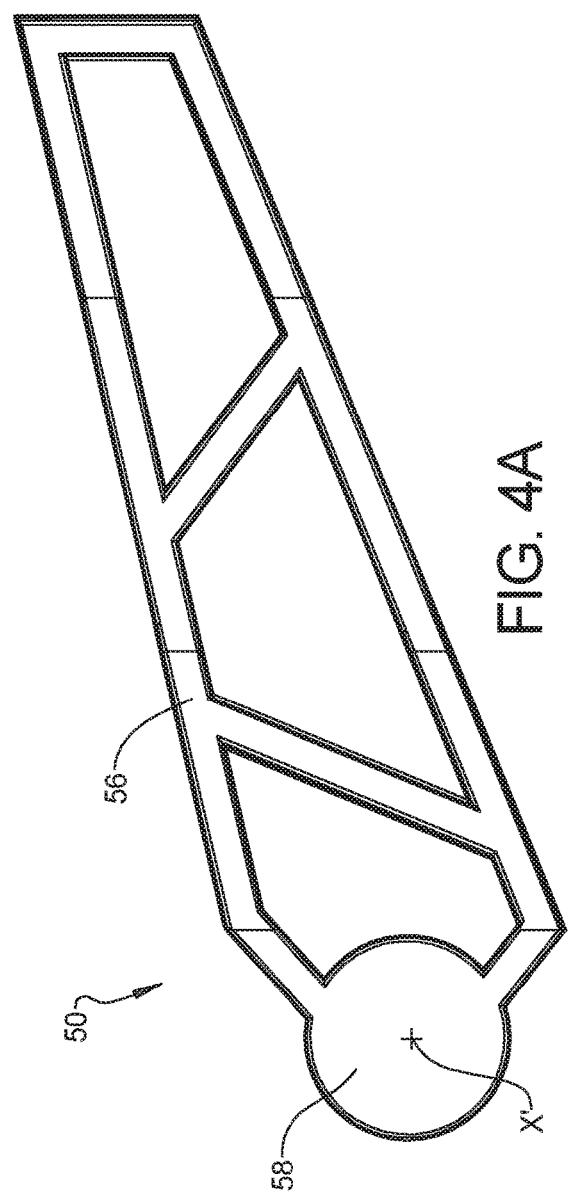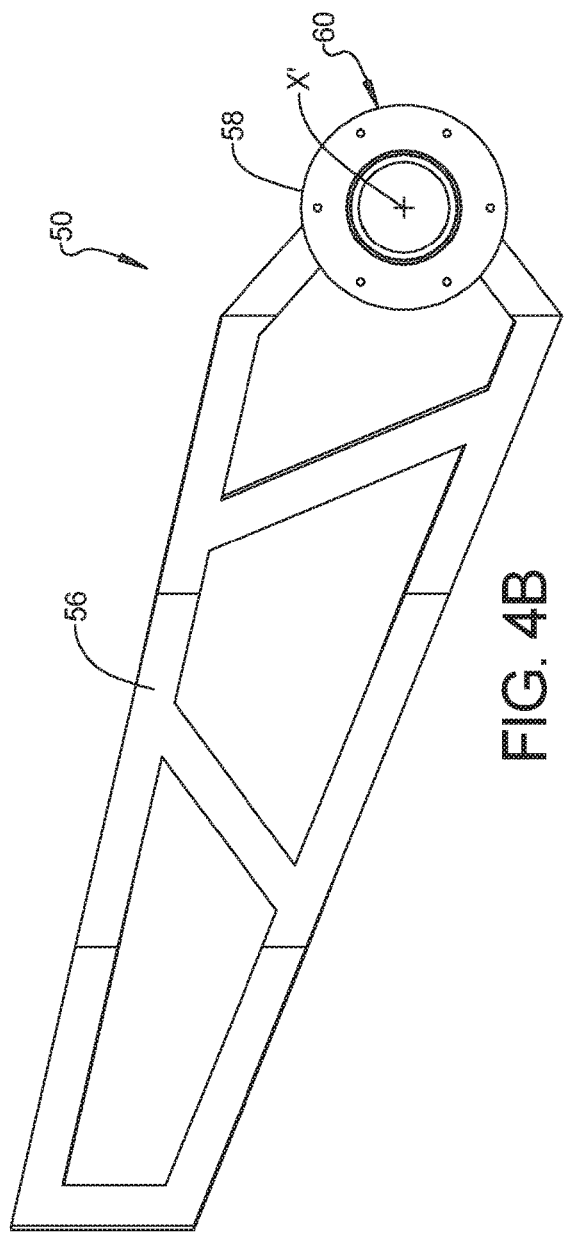

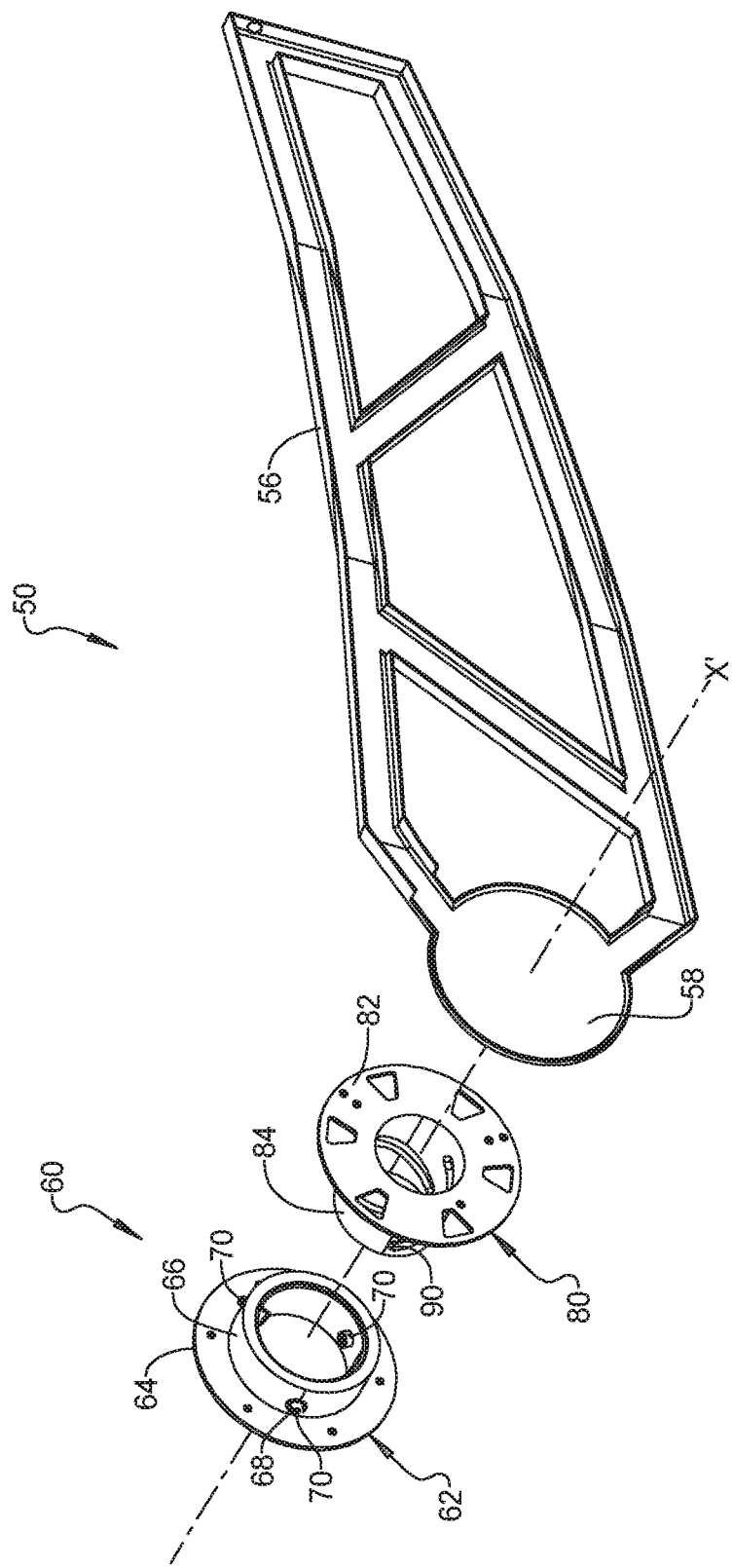

DOOR ASSEMBLY FOR A VEHICLE

FIELD

The present disclosure relates to a door assembly for a vehicle.

BACKGROUND

This section provides background information related to the present disclosure, which is not necessarily prior art.

Most vehicles include a pair of doors, which are attached to the vehicle with hinges. The hinges allow the doors to pivot between open and closed positions. To move the doors from the closed position to the open position, the doors are typically unlatched and then pulled outward and away from a passenger compartment of the vehicle. Each one of the doors pivots about its respective hinge in a plane that is generally parallel to a surface that the vehicle is seated on. While current doors are suitable for their intended use, they are subject to improvement. For example, when the vehicle is in a confined space (such as a narrow trailer), it may be difficult (if not impossible) to open the doors far enough to allow a person to enter or exit the vehicle due to interference by trailer walls, neighboring vehicles, garage walls, or other obstacles. The present disclosure provides for improved doors that overcome these disadvantages. The present disclosure provides numerous additional advantages as well, as described in detail herein and as one skilled in the art will appreciate.

SUMMARY

This section provides a general summary of the disclosure, and is not a comprehensive disclosure of its full scope or all of its features.

The present disclosure includes a door assembly for a vehicle. The door assembly has a door body and a hinge. The hinge is connected to the door body and is rotatable about an axis of the hinge. The hinge is configured to expand along the axis from a contracted position to an expanded position when rotated in a first direction, and is configured to contract along the axis from the expanded position to the contracted position when rotated in a second direction that is opposite to the first direction. In the contracted position, the door body is in a closed, lowered position. In the expanded position, the door body is in an open, raised position.

The present disclosure also provides for a chassis defining a passenger compartment and an opening to the passenger compartment. A first axis extends along a length of the chassis between a front and a rear of the chassis. A second axis extends along a width of the chassis perpendicular to the first axis. A door assembly is mounted to the chassis. The door assembly includes a hinge connected to a door body. The hinge is rotatable about a hinge axis that extends in a common direction as the second axis. The hinge is configured to expand along the hinge axis from a contracted position to an expanded position when rotated in a first direction. The hinge is configured to contract along the hinge axis from the expanded position to the contracted position when rotated in a second direction that is opposite to the first direction. In the contracted position the door body is in a closed, lowered position to restrict access to the passenger compartment. In the expanded position the door body is in an open, raised position to permit access to the passenger compartment. The hinge moves the door body outward from the passenger compartment, parallel to the hinge axis, as the door body is moved from the closed, lowered position to the open, raised position. The hinge moves the door body inward towards the passenger compartment, parallel to the hinge axis, as the door body is moved from the open, raised position to the closed, lowered position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is an outer, side view of one of the doors of FIG. 1;

FIG. 4B is an inner, side view of the door of FIG. 4A;

FIG. 5 is an exploded view of a door latch in accordance with the present disclosure;

Corresponding reference numerals indicate corresponding parts throughout the several views of the drawings.

DETAILED DESCRIPTION

Example embodiments will now be described more fully with reference to the accompanying drawings.

Figure 1:
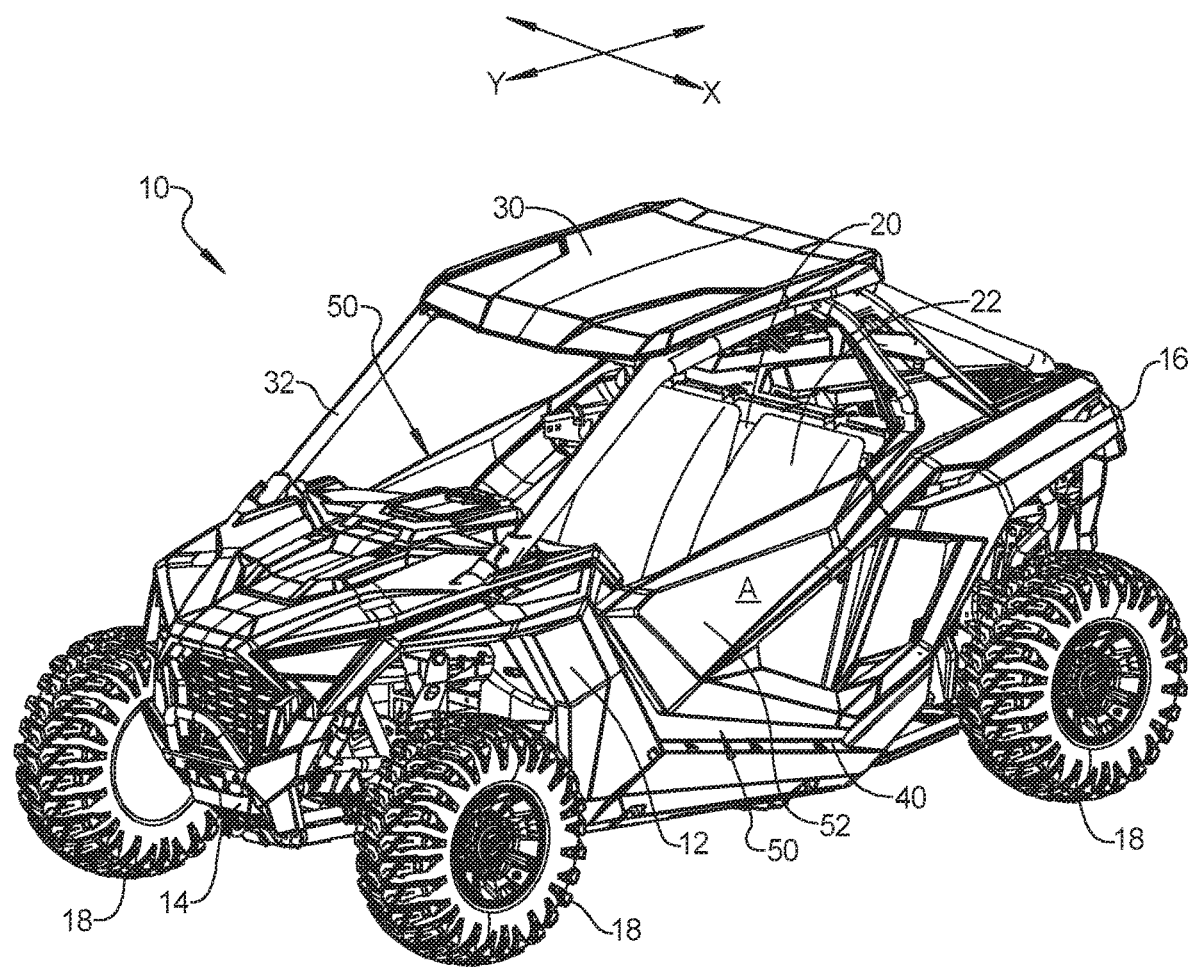
FIG. 1 is a perspective view of an exemplary vehicle including vehicle doors in accordance with the present disclosure.

FIG. 1 illustrates an exemplary vehicle at reference numeral 10. The vehicle 10 may be any suitable vehicle, such as any suitable passenger vehicle, recreational vehicle, all-terrain vehicle, off-road vehicle, military vehicle, etc. The vehicle 10 includes a chassis 12. The vehicle 10 has a front end 14 and a rear end 16. A longitudinal axis Y of the vehicle 10 extends along a length of the vehicle between the front end 14 and the rear end 16. A transverse axis X of the vehicle 10 extends perpendicular to the longitudinal axis Y across a width of the vehicle 10. The vehicle 10 includes any suitable number of wheels 18, such as three or four wheels 18.

The chassis 12 defines a passenger compartment 20 including one or more seats 22. With respect to the exemplary vehicle 10 as illustrated, the passenger compartment 20 is covered by a roof 30. The roof 30 is supported over the passenger compartment 20 by roof supports 32, which are also known as A-pillars.

The chassis 12 further defines one or more door frames 40 through which persons may enter and exit the passenger compartment 20. In the example illustrated, the chassis 12 defines two door frames 40 on opposite sides of the vehicle 10. Mounted to the chassis 12 at each door frame 40 is a door assembly 50. In the example of FIG. 1, two door assemblies 50 are included—one door assembly 50 per door frame 40 on opposite sides of the vehicle 10. Both of the door assemblies 50 are the same (or mirror images or structures of one another), and thus the detailed description of the door assembly 50 provided herein applies to both door assemblies. The door assemblies 50 need not be the same, however, and in some applications only a single door assembly 50 may be included, or more than two (such as four) door assemblies 50 may be included.

Figure 2:
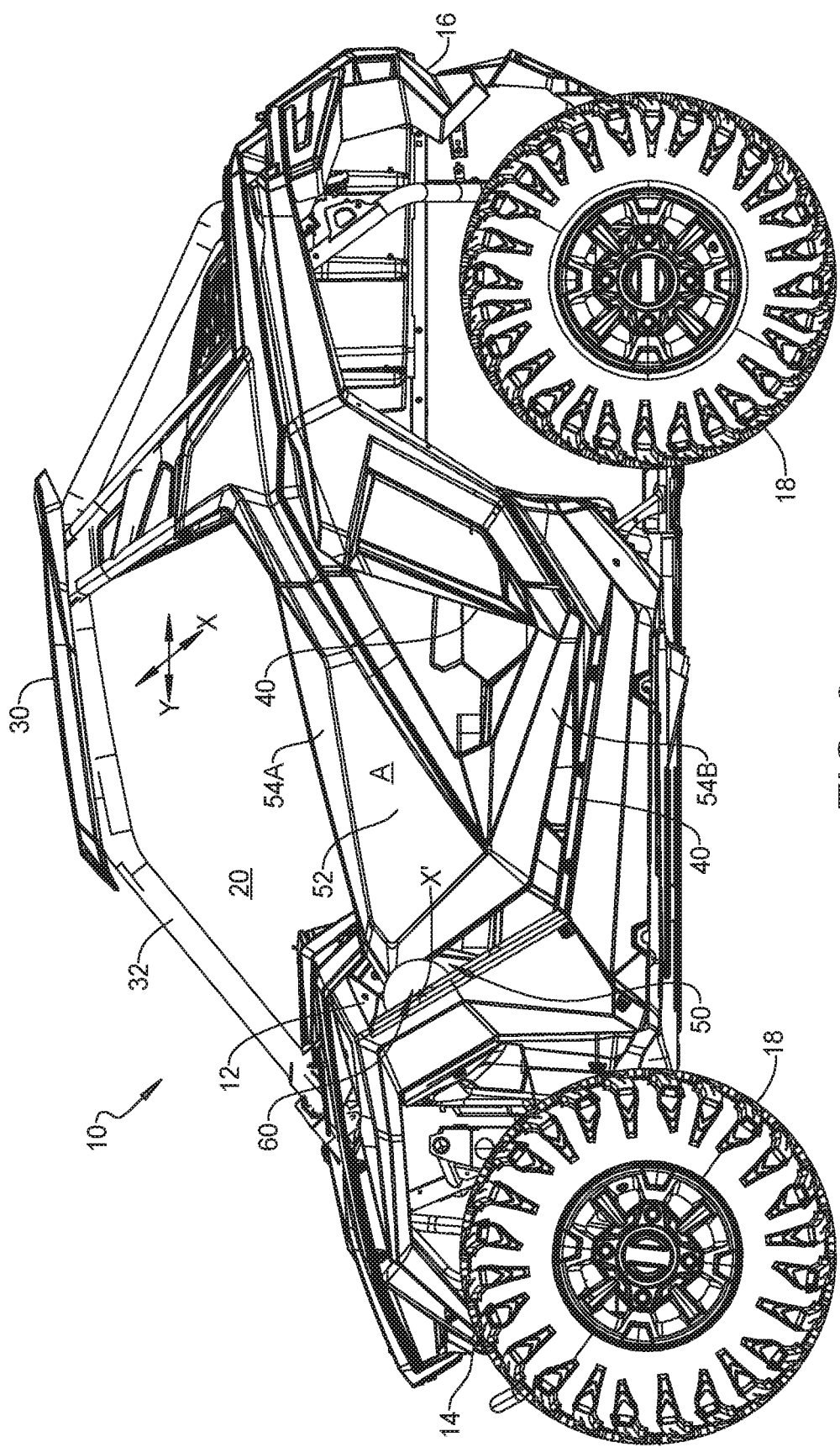
FIG. 2 is a side view of the vehicle of FIG. 1 with the doors in a closed position.
Figure 3:
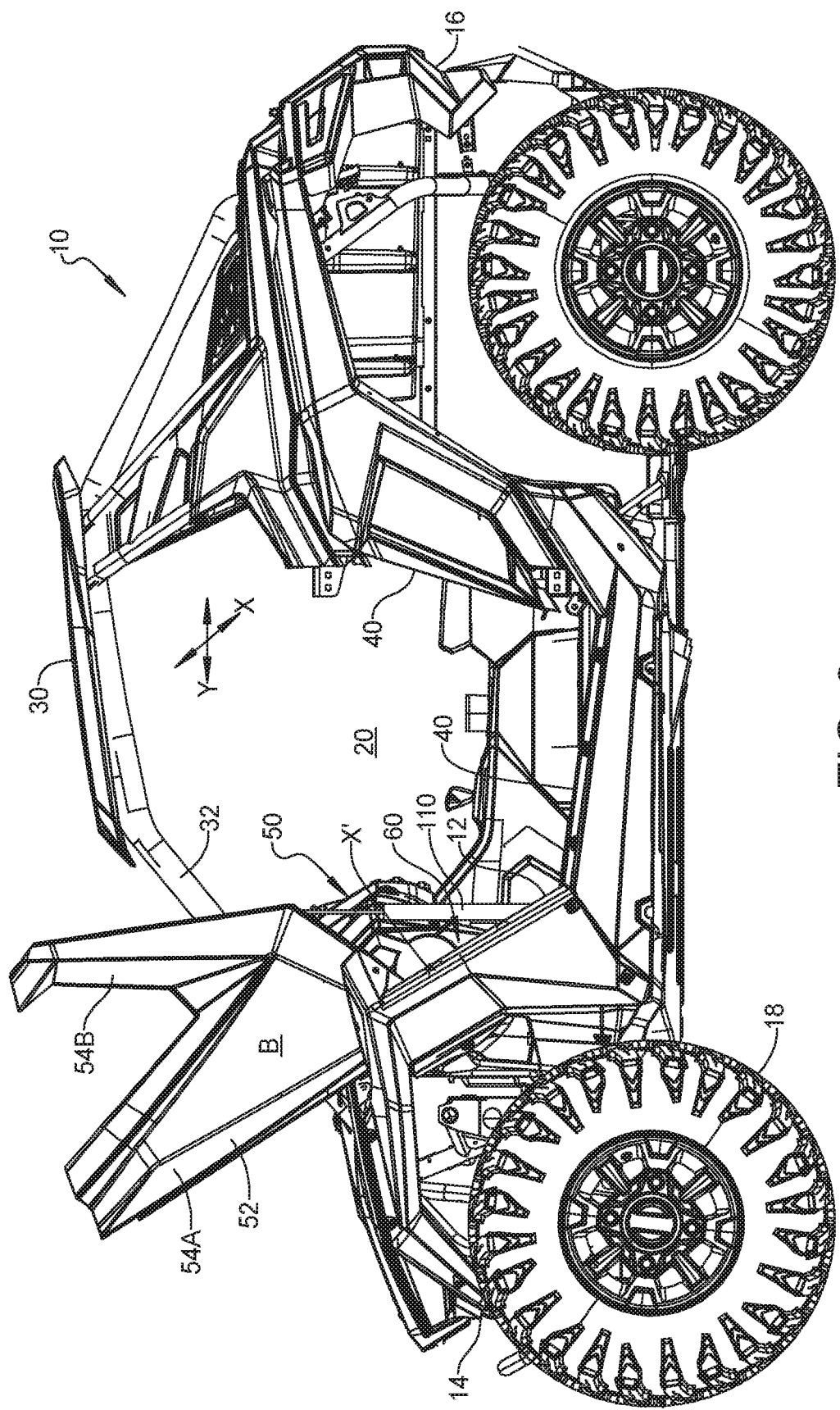
FIG. 3 is a side view of the vehicle of FIG. 1 with the doors in an open position.

FIGS. 1 and 2 illustrate the door assembly 50 in a closed, lowered position A. FIG. 3 illustrates the door assembly 50 in an open, raised position B. As illustrated in FIGS. 1-3, the door assembly 50 includes a door outer panel 52. With particular reference to FIGS. 2 and 3, the door outer panel 52 includes a first portion 54A and a second portion 54B. A gap or opening in the door outer panel 52 is defined between the first portion 54A and the second portion 54B. The door outer panel 52 may be configured in any other suitable manner as well, such as to have any other suitable shape other than that illustrated and/or to eliminate the gap between the first and second portions 54A and 54B.

With additional reference to FIGS. 4A and 4B, the door assembly 50 further includes a door body or frame 56 to which the door outer panel 52 is mounted to and over. The door body 56 may be any suitable size and shape, and generally extends across the door frame or base 40. The door body 56 includes a hinge base 58, which is connected to a door hinge 60. The door hinge 60 is mounted to the chassis 12 in any suitable manner, such as described herein. FIG. 4A illustrates an outer side of the door body 56, as viewed from an exterior of the passenger compartment 20. FIG. 4B illustrates an inner side of the door assembly 50, such as viewed from an interior of the passenger compartment 20. As illustrated in FIG. 4B, the door hinge 60 is mounted to an interior side of the base 58 of the door body 56. The door hinge 60 rotates about a hinge axis X' to move the door assembly 50 from the closed, lowered position A of FIGS. 1 and 2 to the open, raised position B of FIG. 3, as well as to any suitable position therebetween.

Figure 6:
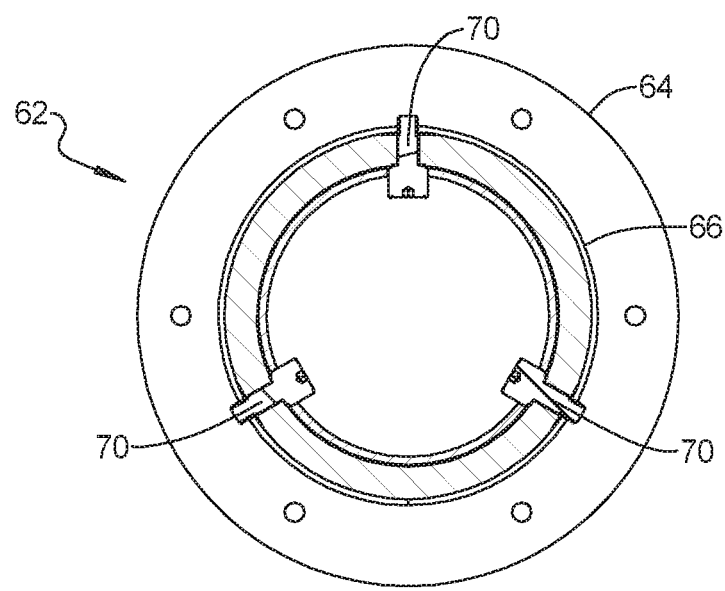
FIG. 6 illustrates a base of the door latch of FIG. 5.

With reference to FIG. 5, the hinge 60 will now be further described. The hinge 60 generally includes a hinge base 62 (also illustrated in FIG. 6), which cooperates with a door guide 80 (also illustrated in FIG. 7). The door guide 80 is rotatable about the hinge axis relative to the hinge base 62. In the example illustrated, the hinge base 62 includes an annular flange or ring 64, which is mounted to the chassis 12 in any suitable manner, such as with fasteners extending directly or indirectly into cooperation with the chassis 12 through apertures defined by the ring 64. Extending from the ring 64 is a cylindrical flange 66 of the hinge base 62. The hinge axis X' extends through an axial center of both the ring 64 and the flange 66. The flange 66 defines apertures 68, through which posts or bolts 70 radially extend inward in the direction of the hinge axis X'. Any suitable number of posts 70 may be included, such as three posts 70 in the example illustrated. The posts 70 are all arranged in a common plane, which is perpendicular to the hinge axis X'.

Figure 7:
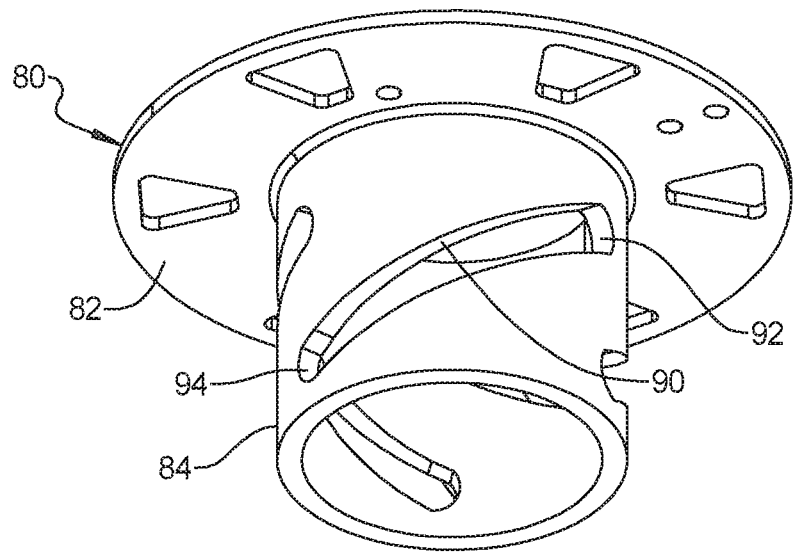
FIG. 7 illustrates a door guide of the door latch of FIG. 5

With continued reference to FIG. 5 and additional reference to FIG. 7, the door guide 80 includes a guide base 82, which is connected to the base 58 of the door body 56 in any suitable manner, such as with fasteners extending through openings defined by the guide base 82. Extending from a side of the guide base 82 that is opposite to the base 58 of the door body 56 is a cylindrical guide flange 84. The guide flange 84 defines door guide channels or slots 90. Any suitable number of door guide channels 90 may be included. Generally, the number of door guide channels 90 will equal the number of posts 70 because each one of the posts 70 is seated within a different one of the door guide channels 90. Thus, the guide flange 84 is concentrically seated within the flange 66 of the hinge base 62 to permit such cooperation between the posts 70 and the door guide channels 90. The hinge axis X' extends through an axial center of both the guide base 82 and the guide flange 84.

With particular reference to FIG. 7, each one of the door guide channels 90 includes a first end 92 and a second end 94. Each one of the channels 90 extends in a helical manner from the first end 92 to the second end 94 partially around the hinge axis X', and along the hinge axis X'. Because the posts 70 are seated within the channels 90, the degree of rotation of the door guide 80 (and the door body 56 connected thereto) is limited by the length of the channels 90. Although the channels 90 have a helical shape in the examples illustrated, the channels 90 may have any other suitable shape to provide both rotational and translational movement of the door guide 80 relative to the hinge base 62.

Figure 8A:
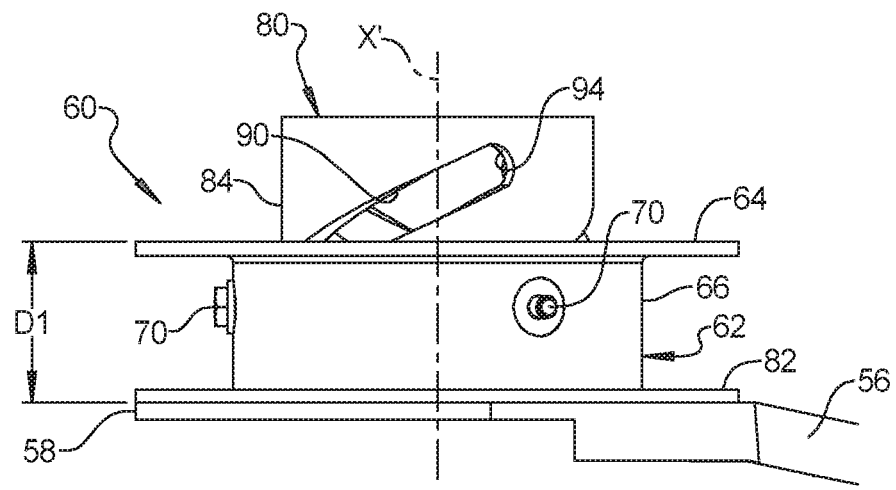
FIG. 8A illustrates the door latch of FIG. 5 in a closed position.
Figure 8B:
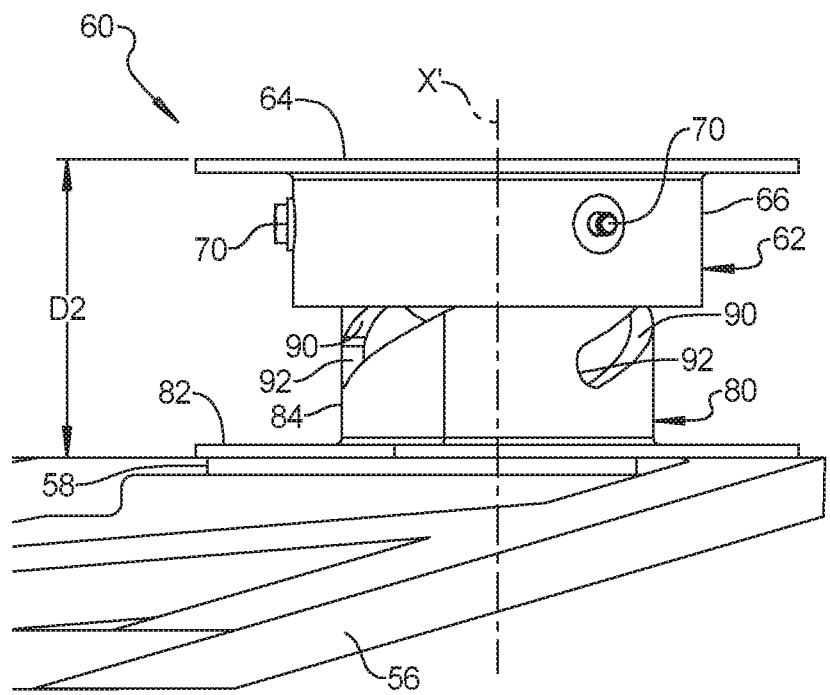
FIG. 8B illustrates the door latch of FIG. 5 in an open position.

With additional reference to FIGS. 8A and 8B, actuation of the door hinge 60 will now be described in detail. FIG. 8A illustrates the door hinge 60 in a contracted or retracted, closed position and FIG. 8B illustrates the door hinge 60 in an expanded, open position. In the retracted position of FIG. 8A, the base 58 of the door body 56 is spaced apart from the ring 64 of the hinge base 62 (which is coupled directly or indirectly to the chassis 12) by distance D1. In this contracted, closed position of FIG. 8A, the posts 70 are seated at the first ends 92 of the channels 90. The guide flange 84 extends through both the flange 66 and the ring 64 of the hinge base 62.

As the door assembly 50 is rotated from the contracted, closed position of FIG. 8A, the door guide 80 rotates about the hinge axis X' relative to the stationary hinge base 62, which moves the door guide channels 90 about the posts 70 until the posts 70 contact the second ends 94 of the channels 90. Because the channels 90 are helical channels extending about the hinge axis X', as the door guide 80 is rotated relative to the stationary hinge base 62, the door hinge 60 will move along or about the hinge axis X' from the contracted position of FIG. 8A to the expanded position of FIG. 8B. In the expanded position of FIG. 8B, the distance D2 between the base 58 of the door body 56 and the ring 64 of the hinge base 62 is increased to D2 (which is greater than distance D1). Thus, as the door hinge 60 is rotated from the contracted (closed) position of FIG. 8A to the expanded (open) position of FIG. 8B, the door body 56 mounted to the door guide 80 moves or rotates parallel to the hinge axis X' (and along axis X of the vehicle 10) away from the ring 64 of the hinge base 62, and away from the chassis 12 that the hinge base 62 is mounted to. This advantageously provides clearance between the door body 56 (and door outer panel 52 mounted thereto) and the roof support or A-pillar 32.

In other words, the door body 56 is in the closed position A when the door hinge 60 is in the retracted position of FIG. 8A. As the door assembly 50 is rotated from the closed position A to the open position B, the hinge 60 rotates about the hinge axis X' to expand the hinge 60 along the hinge axis X' to the expanded position of FIG. 8B. As the door body 56 rotates about hinge axis X', the hinge 60 shifts or axially moves the door body 56 outward from the passenger compartment 20 parallel to the hinge axis X' and in the direction X (see FIG. 1), which is perpendicular to the longitudinal axis Y of the vehicle 10. As the door assembly 50 is rotated from the open position B to the closed position A, the door guide 80 rotates relative to the hinge base 62, which rotates the door guide channels 90 about the posts 70 until the posts 70 contact the first ends 92 of the channels 90, thereby causing the guide flange 84 to retract back into the flange 66, which moves the door body 56 parallel to the hinge axis X' and along the axis X axially back towards the vehicle 10 to return the door body 56 to within the door frame 40. The door frame 40 may include any suitable guide members to facilitate the return of the door body 56 into cooperation with the door frame 40.

When in the open position B, mass of the door body 56 is centered over the hinge axis X', which advantageously retains the door assembly 50 in the open position B, and thus no other door support device is required. However, in some applications a suitable door support may be included. FIG. 3 illustrates an exemplary door support in the form of a strut 110. The strut 110 may be a gas-filled strut, for example. The strut 110 is positioned such that when the door assembly 50 is in the open position B, the strut 110 is fully extended to help maintain the door assembly 50 in the open position B. The door strut 110 is in a fully retracted position when the door assembly 50 is about halfway between the open position B and the closed position A. In other words, the strut 110 will be fully contracted when the door body 56 is at about a 45° angle between closed position A and open position B. The door strut 110 will also be fully extended in the closed position A of FIGS. 1 and 2 to help maintain the door assembly 50 in the closed position A.

Thus to open the door assembly 50 from the closed position A to the open position B, a user will push the door assembly 50 upward and forward until the strut 110 rotates to about a 45° angle and is fully compressed. As the user rotates the door assembly 50 such that the strut 110 is rotated slightly greater than 45°, the strut 110 will begin to expand to the extended position of FIG. 3 and thus the strut 110 will push the door assembly 50 to the open position A with little or no manual effort required. To close the door assembly 50, the user need only pull the door assembly 50 downward until the strut 110 is fully compressed and slightly beyond a 45° angle, which will cause the strut 110 to re-expand and move the door assembly 50 to the closed position A with little or no manual effort. Thus the door assemblies 50 on both sides of the vehicle 10 can be fully opened with minimal clearance.

Although the figures illustrate the hinge base 62 as coupled to the chassis 12 and the guide base 82 as connected to the base 58 of the door body 56, this orientation may be reversed such that in some applications the guide base 82 of the door guide 80 is mounted directly or indirectly to the chassis 12 and the ring 64 of the hinge base 62 is connected to the base 58 of the door body 56. Furthermore, although the door guide channels 90 are illustrated as being defined by the guide flange 84 and the posts 70 extending from the flange 66, this orientation may be reversed such that the door guide channels 90 are defined by the flange 66 and the posts 70 extend from within the guide flange 84. Although the hinge 60 and base 58 are arranged at a front end of the door body 56, in some applications the hinge 60 and base 58 may be arranged at a rear end of the door body 56, such that the hinge 60 is mounted to a portion of the chassis 12 at a rear end of the door frame 40. Furthermore, to facilitate rotation of the door assembly 50 between the closed position A and the open position B, a suitable automatic actuator may be included, such as any suitable motor coupled to the hinge 60 and/or the door body 56 in a manner adequate to rotate the door assembly 50 open and closed.

Figure 9:
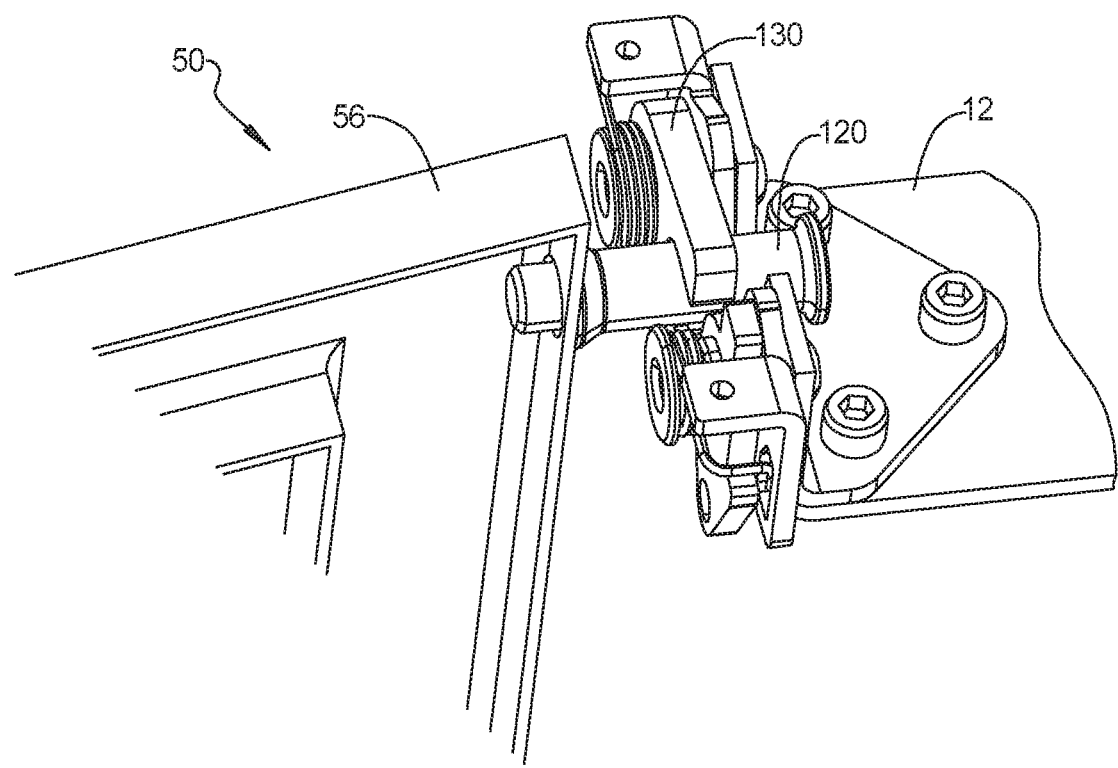
FIG. 9 illustrates cooperation between a striker of one of the doors of FIG. 1 and a latch mounted to a chassis of the vehicle.

With reference to FIG. 9, any suitable locking device may be included to lock the door assembly 50 in the closed position A. In the example of FIG. 9, the locking device includes a striker 120 extending from a rear end of the door body 56. A latch 130 is mounted to an opposite portion of the chassis 12. The latch 130 is configured to receive the striker 120 and retain the striker 120 to lock the door assembly 50 in the closed position. Although the striker 120 is illustrated as at a rear end of the door body 56, the striker 120 may be arranged at any other suitable location, and the latch 130 may be arranged at any opposing portion of the chassis 12. Although the striker 120 is illustrated as extending from the door body 56, this configuration may be reversed such that the latch 130 is mounted to the door body 56 and the striker 120 is mounted to the chassis 12.

The present disclosure thus advantageously provides for a door assembly 50 with a hinge 60 that allows the door body 56 (and the door outer panel 52 mounted thereto) to be rotated up and down between closed position A and open position B, which allows users to enter and exit the passenger compartment 20 even when the vehicle 10 is seated in a narrow trailer or other tight space, which would prevent traditional doors from pivoting outward from the sides of the vehicle 10. In the examples illustrated, the door body 56 (and the door outer panel 52 mounted thereto) rotate about 135° from the closed position A to the open position B. However, the door assembly 50 may be configured to rotate any other suitable distance from a closed position to an open position at which the mass of the door body 56 is centered over the hinge axis X'. Furthermore, the hinge 60 advantageously shifts the door body 56 (and the door outer panel 52 mounted thereto) outward from the chassis 12 along the vehicle axis X and the hinge axis X' as the door assembly 50 is moved from the closed position A to the open position B, which prevents the door outer panel 52 from contacting the roof 30 and/or roof support 32 (which for some vehicles is referred to as an A-pillar). The door assembly 50 can fully open with only about six inches or less of transverse travel relative to the axis X. The amount of transverse travel will depend in most applications on how far the door assembly 50 is configured to rotate from the closed position A to the open position B. The degree to which the door assembly 50 rotates from the closed position A to the open position B, and the amount of transverse travel, is such that an operator is able to grasp the door assembly 50 (such as a handle thereof) to close the door assembly 50 while the operator is seated within the vehicle 10. Thus, both door assemblies 50 can be opened without extending outward beyond (or only slightly outward beyond) the chassis 12 and the tires 18. This further facilitates opening of the door assemblies 50 in a confined space, such as a trailer. In some applications, the door outer panel 52 is sized and shaped such that in the open position B the door outer panel 52 does not extend higher than, or extends only slightly higher than, the roof 30 to allow the door assembly 50 to be opened when the vehicle is in a trailer, for example.

Furthermore, the hinge 60 advantageously couples the door body 56 to the chassis 12 with greater rigidity as compared to existing hinges. The added rigidity that the hinge 60 provides advantageously reduces or eliminates any sway of the door body 56. The added rigidity is provided by, for example, the large surface area of the interface between the guide base 82 and the base 58 of the door body 56.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A door assembly for a vehicle, the door assembly comprising:
   a door body; and
   a hinge connected to the door body, the hinge is rotatable about an axis thereof, the hinge configured to axially expand along the axis from a contracted position to an expanded position when rotated in a first direction, and the hinge configured to axially contract along the axis from the expanded position to the contracted position when rotated in a second direction that is opposite to the first direction;
   wherein in the contracted position the door body is in a closed position and in the expanded position the door body is in an open position; and
   wherein in the open position mass of the door body is centered over the axis of the hinge to retain the door body in the open position, which is a raised position.

2. The door assembly of claim 1, wherein:
   the hinge includes a base and a door guide in cooperation with the base; and
   one of the base and the door guide is mounted to the door body, and another one of the base and the door guide is mounted to a chassis of the vehicle.

3. The door assembly of claim 2, wherein the base is in rotational cooperation with the door guide, and the axis of the hinge extends through an axial center of each one of the base and the door guide.

4. The door assembly of claim 2, wherein the door guide includes a plurality of helical members in cooperation with the base, each one of the helical members extends around and along the axis of the hinge.

5. The door assembly of claim 2, wherein the door guide includes a plurality of helical channels and the base includes a plurality of posts, each one of the plurality of posts is in cooperation with a different one of the plurality of helical channels.

6. The door assembly of claim 5, wherein in the contracted position of the hinge the plurality of posts are at a first end of each of the plurality of helical channels, and in the expanded position of the hinge the plurality of posts are at a second end of each of the plurality of helical channels;
   wherein the posts slide along the plurality of helical channels as the hinge is rotated from the contracted position to the expanded position.

7. The door assembly of claim 6, wherein each one of the plurality of posts is in a common plane perpendicular to the axis of the hinge.

8. The door assembly of claim 1, further comprising a door support member that supports the door body in the open position.

9. The door assembly of claim 8, wherein the door support member is a strut.

10. The door assembly of claim 9, wherein the strut is arranged such that the strut is fully compressed when the door body is midway between the closed position and the open position.

11. The door assembly of claim 10, wherein the strut is arranged such that the strut is fully extended when the door body is in the closed position and fully extended when the door body is in the open position.

12. The door assembly of claim 1, further comprising a striker and a latch configured to retain the striker, the striker is connected to one of the door body and a chassis of the vehicle, and the latch is connected to a different one of the door body and the chassis.

13. A vehicle comprising:
   a chassis defining a passenger compartment and an opening to the passenger compartment, a first axis extends along a length of the chassis between a front and a rear of the chassis, and a second axis extends along a width of the chassis perpendicular to the first axis; and
   a door assembly mounted to the chassis, the door assembly including a hinge connected to a door body, the hinge is rotatable about a hinge axis, the hinge configured to expand along the hinge axis from a contracted position to an expanded position when rotated in a first direction, and the hinge configured to contract along the hinge axis from the expanded position to the contracted position when rotated in a second direction that is opposite to the first direction;
   wherein:
      in the contracted position the door body is in a closed, lowered position to restrict access to the passenger compartment, and in the expanded position the door body is in an open, raised position to permit access to the passenger compartment;
      the hinge moves the door body outward from the passenger compartment, parallel to the hinge axis, as the door body is moved from the closed, lowered position to the open, raised position; and
      the hinge moves the door body inward towards the passenger compartment, parallel to the hinge axis, as the door body is moved from the open, raised position to the closed, lowered position; and
      in the open, raised position mass of the door body is centered over the hinge axis to retain the door body in the open, raised position.

14. The vehicle of claim 13, wherein:
   the hinge includes a base and a door guide in cooperation with the base; and
   one of the base and the door guide is mounted to the door body, and another one of the base and the door guide is mounted to the chassis of the vehicle.

15. The vehicle of claim 14, wherein the base is in rotational cooperation with the door guide, and the hinge axis extends through an axial center of each one of the base and the door guide.

16. The vehicle of claim 14, wherein the door guide includes a plurality of helical members in cooperation with the base, each one of the helical members extends around and along the hinge axis.

17. The vehicle of claim 14, wherein:
   the door guide includes a plurality of helical channels and the base includes a plurality of posts, each one of the plurality of posts is in cooperation with a different one of the plurality of helical channels;
   in the contracted position of the hinge the plurality of posts are at a first end of each of the plurality of helical channels, and in the expanded position of the hinge the plurality of posts are at a second end of each of the plurality of helical channels;
   the posts slide along the plurality of helical channels as the hinge is rotated from the contracted position to the expanded position;
   each one of the plurality of posts is in a common plane perpendicular to the hinge axis.

18. A door assembly for a vehicle, the door assembly comprising:
   a door body; and
   a hinge connected to the door body, the hinge is rotatable about an axis thereof, the hinge configured to axially expand along the axis from a contracted position to an expanded position when rotated in a first direction, and the hinge configured to axially contract along the axis from the expanded position to the contracted position when rotated in a second direction that is opposite to the first direction;
   wherein in the contracted position the door body is in a closed position and in the expanded position the door body is in an open position; and
   wherein in the open position mass of the door body and an outer door panel covering the door body is centered over the axis of the hinge to retain the door body in the open position, which is a raised position.

19. A door assembly for a vehicle, the door assembly comprising:
   a door body;
   a hinge connected to the door body, the hinge is rotatable about an axis thereof, the hinge configured to axially expand along the axis from a contracted position to an expanded position when rotated in a first direction, and the hinge configured to axially contract along the axis from the expanded position to the contracted position when rotated in a second direction that is opposite to the first direction, in the contracted position the door body is in a closed position and in the expanded position the door body is in an open position, the open position is a raised position and the closed position is a lowered position; and
   a door support strut that supports the door body in the open position, the strut is arranged such that the strut is fully compressed when the door body is midway between the closed position and the open position.

* * * * *